United States Patent [19]

Kaminaka et al.

[11] Patent Number: 4,716,484
[45] Date of Patent: Dec. 29, 1987

[54] MAGNETIC HEAD COMPRISING A CORE FORMED OF SMALL AND LARGE THIN FILM PATTERNS

[75] Inventors: Nobuyuki Kaminaka, Neyagawa; Yasuo Yoshida, Kumamoto, both of Japan

[73] Assignee: Matsushita Electrical Industrial Co., Ltd., Osaka, Japan

[21] Appl. No.: 619,917

[22] Filed: Jun. 12, 1984

[30] Foreign Application Priority Data

Jun. 13, 1983 [JP] Japan ................. 58-105200

[51] Int. Cl.⁴ .................. G11B 5/127; G11B 5/147
[52] U.S. Cl. .................... 360/125; 360/126
[58] Field of Search ............. 360/125, 126, 127

[56] References Cited

U.S. PATENT DOCUMENTS

| | | | |
|---|---|---|---|
| 4,219,854 | 8/1980 | Church et al. | 360/125 |
| 4,239,587 | 12/1980 | Koel et al. | 360/122 |
| 4,404,609 | 9/1983 | Jones, Jr. | 360/126 |
| 4,516,180 | 5/1985 | Narshige et al. | 360/126 |
| 4,550,353 | 10/1985 | Hirai et al. | 360/127 |
| 4,558,385 | 12/1985 | Kaminaka et al. | 360/126 |

Primary Examiner—A. J. Heinz
Assistant Examiner—Melissa J. Koval
Attorney, Agent, or Firm—Spencer & Frank

[57] ABSTRACT

A thin film magnetic head comprising a magnetic core of accumulation layers forming a magnetic circuit and including at least two layers of magnetic film with a particular magnetic characteristic. The constitution of completely covering a magnetic film with a small pattern by a magnetic film with a large pattern makes the edge part smooth because the end of the underlying magnetic film is covered with the upper magnetic film. This edge-smoothing effect appears most pronounced in a manufacturing method in which electrodeposition is used for the formation of magnetic films. By sequentially forming the magnetic films from that of a smaller pattern towards that of a larger pattern, the film formation proceeds at step parts such as end parts of the underlying magnetic films due to the levelling action which is inherent in the electrodeposition method. Such a film formation realizes extremely smooth shielding and yet the pattern formation can be carried out by a single step of photoresist coating to shorten the production process.

1 Claim, 10 Drawing Figures

MAGNETIC HEAD COMPRISING A CORE FORMED OF SMALL AND LARGE THIN FILM PATTERNS

BACKGROUND OF THE INVENTION

1. FIELD OF THE INVENTION

This invention relates to a thin film magnetic head and a method of manufacturing of the same and, more specifically, to a transducer for use in the disk memories of electronic computers. Furthermore, since this invention basically relates to a magnetic core in a thin film magnetic head, it can be applied to other magnetic recording products, such as magnetic heads or magnetic sensors for video tape recorders and audio apparatus.

2. DESCRIPTION OF THE PRIOR ART

The characteristics of a thin film magnetic head have been conventionally utilized in a disk head for electronic computers, as shown in FIG. 1. In order to improve reproduction at short wavelengths, the thickness of the magnetic core on the side opposite the medium 1 is designed to have a fintie length of a few μm. On the other hand, in order to improve the decay of the recording characteristics due to magnetic saturation, the rear part is made thicker. Note that the lower magnetic core 2 is composed of an accumulated layer of a plurality of magnetic films 3, 4 and 5. The upper magnetic core 6 is also composed of an accumulated layer of a plurality of magnetic films 7 and 8. A magnetic circuit is formed by these upper and lower magnetic cores 2 and 6. In FIG. 1, an 8-turn coil-layer 9 constitutes a thin film magnetic head with a form which intersects with the magnetic circuit. $X_1$ denotes a non-magnetic substrate, and $X_2$ denotes a non-magnetic insulating layer provided on the surface of the substrate.

These upper and lower magnetic cores 2 and 6 of such a magnetic head are formed successively in the order of larger to smaller patterns, as shown in FIG. 1; namely, the lower magnetic core 2 is formed in the order of magnetic films 3, 4 and 5 while the upper magnetic core 6 is formed in the order of magnetic films 7 and 8.

For the manufacturing method in which the magnetic films are always formed on a flat part successively, the above-mentioned order is preferable for the formation of magnetic films by the electrodeposition method, and the method relying upon the order has been considered to be a practical method. However, it has been made apparent recently that the method contains defects from the viewpoints of the constitution of the magnetic head and the method of manufacturing it. According to the electrodeposition method, an electrode layer 10 for electrodeposition exists under the magnetic film 3 or the magnetic film 7. The electrode layer 10 is usually formed on the whole non-magnetic substrate $X_1$ to a thickness of from 500 Å to a few thousands Å either by sputtering or by the evaporation method. Next, a photoresist coating is applied. After pre-baking, an exposure is effected through a prescribed photo-mask relevant to the shape of the magnetic film 3. Development and rinsing follow. These are the normal steps of photolithography. Then, by dipping in an electrodeposition bath, the magnetic film 3 is formed. After sufficient washing by water, a photoresist coating is again provided and the above-mentioned processes are repeated. In this case, in order to reduce any interference between a preceding photoresist coating and a subsequent photoresist coating, the preceding photoresist coating is baked for 30 minutes at 100° C. to 110° C. before the provision of a new photoresist coating. Since this baking process is necessary, the previously electrodeposited surfaces vary. The surface characteristics of successively electrodeposited magnetic films suffer from decay while some magnetic films with different patterns are formed. In an extreme case, the composition can vary and the magnetic characteristics is damaged.

Since photoresists are applied several times, there has been another defect in that the operation has poor efficiency. A further defect is that the edge of the electrodeposited magnetic layer is sharp: for example, a sharp corner part 11 of the magnetic layer 4 in the lower magnetic core 2 or a corner part 12 of the magnetic layer 8 in the upper magnetic core 6. Sharp edges of such corner parts 11 and 12 are one of the major characteristics of the electrodeposition method. The form is much preferred for defining the dimension T in the direction of track width as shown in FIG. 2. However, it has been found that the sharpness at the above-mentioned parts has the following problem. Namely, if the corner part 11 is sharp, the distance between the upper and lower magnetic cores 2 and 6 becomes narrow at this part and the magnetic efficiency is decreased. Furthermore, if the corner part 12 is sharp, coverage of the part by the protecting layer 13 of $SiO_2$ or $Al_2O_3$ is not good. It happens that defects such as microcracks appear. The product field, therefore, has been low.

SUMMARY OF THE INVENTION

This invention provides a thin film magnetic head with a good magnetic characteristic and a high magnetic efficiency, and provides a method for manufacturing a thin film magnetic head wherein the efficiency of operation is good; stable electrodeposition is possible; and the product yield is high.

In the thin film magnetic head of this invention, the magnetic core made up of accumulation layers is composed of at least two layers of magnetic film from the view point of magnetic characteristics. The constitution of completely covering a magnetic film of a small pattern with a magnetic film of a large pattern makes the edge part smooth because the end of the underlying magnetic film is covered with the upper magnetic film. Therefore, the defect in the prior art is overcome. This effect appears most pronounced in a manufacturing method where electrodeposition is used for the formation of magnetic films. By the formation of magnetic films in the order of forming from smaller patterns, the film formation due to the levelling action which is inherent in the electrodeposition method proceeds at such step parts as end parts of the underlying magnetic films. Therefore, extremely smooth screening is realized.

DESCRIPTION OF THE PREFERRED EMBODIMENT

Figure 3A:
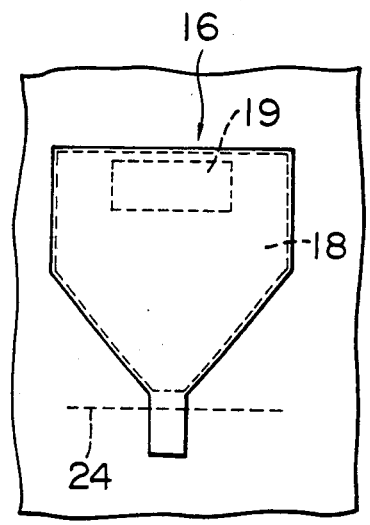
FIG. 3A and FIG. 3B are planar and cross-section views showing the constitution of an embodiment of this invention.
Figure 3B:
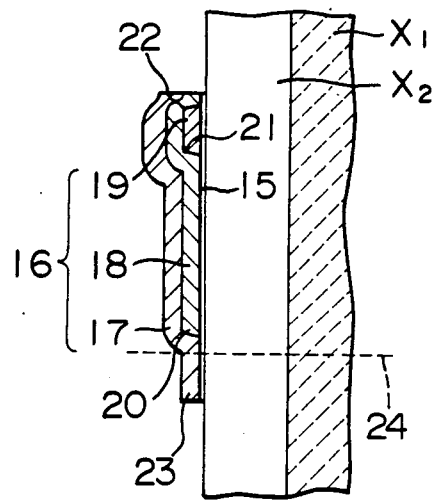

An embodiment of the accumulated layer of the magnetic core section of this invention will be explained in conjunction with FIGS. 3A and 3B. FIG. 3B is a cross-section of FIG. 3A. After an electrode for electrodeposition 15 is formed over the whole non-magnetic substrate $X_1$ through a non-magnetic insulating layer $X_2$, a magnetic film 19 having the smallest pattern and constituting an accumulation layer 16 of the magnetic core is formed. Then, a magnetic film 18 having a larger pattern is formed. Finally, a magnetic film having the largest pattern is formed.

Here, the fact that a pattern is large or small is concerned with the area for electrodeposition. It means also that a larger pattern contains a smaller pattern. In this way, the electrodeposition film on the sharp corner parts 20, 21 and 22 tends to become round. No sharp corner part exists at the highest part. Since the corner part 23 is removed at the final stage by cutting for processing at the position of gap depth 24, this part is not of concern.

Figure 4A:
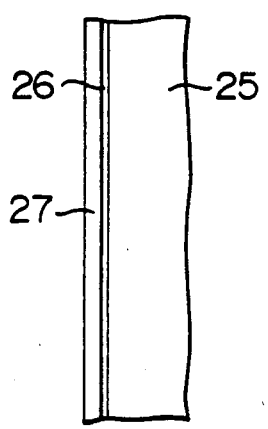
FIGS. 4A to 4E are diagrams for explaining the inventive manufacturing steps.

Next, the manufacturing procedures will be explained successively with reference to FIG. 4A to FIG. 4E. First, as shown in FIG. 4A, an electrode for electrodeposition 26 of Ni-Fe alloy film is formed on the whole underlying surface 25 to a thickness of from 500 Å to a few thousands Å by the sputtering method. Then, a photoresist coating 27 is applied on the electrode 26 and subjected to pre-baking at 90° C. for 15 to 45 minutes (the steps heretofore described are called the "pre-step").

Figure 4B:
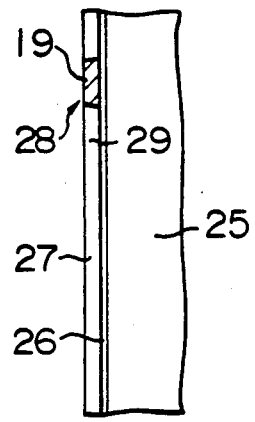

Next, as shown in FIG. 4B, using a photomask corresponding to a magnetic film 19, a part 28 of the photoresist 27 is perforated through exposure and development to make a pattern. Through a current flow to the electrode layer 26 for electrodeposition in a (later-mentioned) prescribed bath for electrodeposition, a magnetic film 19 is formed at the position 28 (these steps are called the "main step"). In the prior art, this electrodeposition may be done in a normal room, that is, a room with illumination containing ultraviolet light. Since the photoresist 27 is removed at every step and applied again, it may be exposed during electrodeposition. However, in the manufacturing method of this invention, the above step is performed in a yellow room (a room with illumination without ultraviolet light) in order to avoid exposure of the resist. This simplifies the operation steps and ensures the embodiment of the manufacturing method of this invention.

Figure 4C:
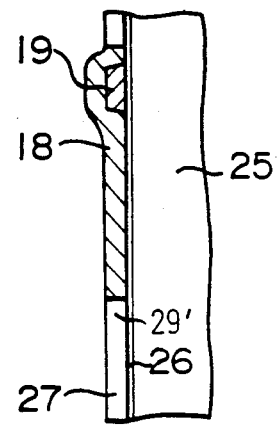
Figure 4D:
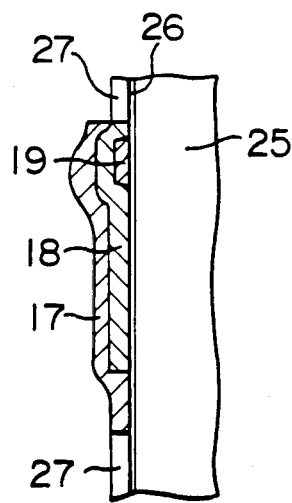
Figure 4E:
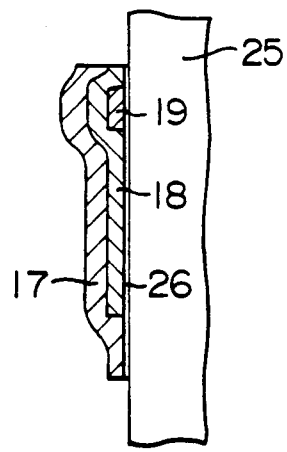

After the magnetic film is formed, the "main step" is repeated. Namely, as shown in FIG. 4C, by using a photo-mask corresponding to a magnetic film 18, a prescribed position is exposed and developed to perform patterning. Through electrodeposition in the bath, the magnetic film 18 is formed. By the same procedure, a magnetic film 17 is formed as shown in FIG. 4D. Thereafter, the residual photoresist 27 is completely exposed and removed by dissolving in an acetone solution. That part of the electrode layer 26 for electrodeposition which protrudes out of a prescribed pattern is removed by sputter etching or chemical etching, etc. This step is called a "post-step". FIG. 4E shows the finished state.

Figures 1, 2:
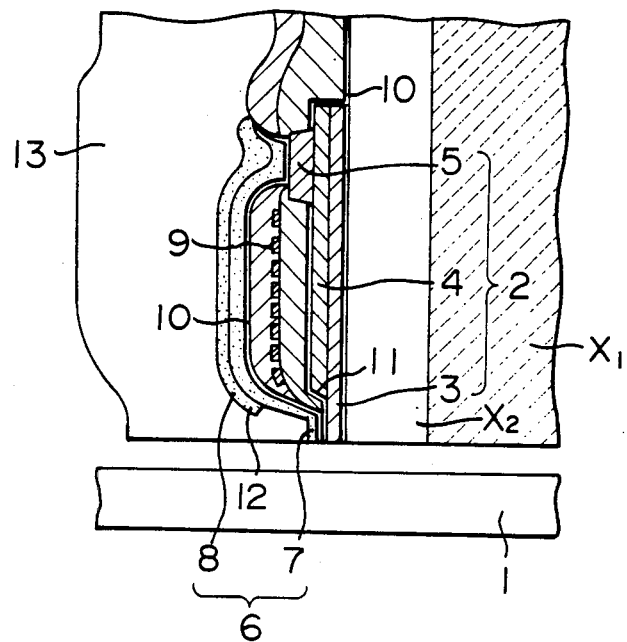
FIG. 1 shows the cross-section of a thin film magnetic head according to the prior art.
FIG. 2 is a planar view showing the main part of the magnetic head of FIG. 1.

We may have a modification of the "main step" as described in the following. The steps of exposure and development by using a photo-mask corresponding to the magnetic film 19, as shown in FIG. 4B, are not immediately followed by electrodeposition here. The only exposure is made by using a photo-mask corresponding to the magnetic film 18 which should be subjected to the subsequent electrodeposition, and then the magnetic film 19 is electrodeposited. Through a developing process, the position for the formation of the magnetic film 18 is patterned. Next, only exposure is made by using a photo-mask corresponding to a magnetic film 17 which should be subjected to the subsequent electrodeposition. Thus, the magnetic film 18 is electrodeposited. Through another development process, the position for the formation of the magnetic film 17 is patterned. In this example, since one accumulation layer of the magnetic core consists of three layers, the "main step" ends when the magnetic film 17 is electrodeposited on the patterned position, as shown in FIG. 4D. The feature of this modification of the "main step" shown here is as follows. After the formation of each layer, parts 29 and 29' in the extreme neighborhood of the magnetic films 19 and 18 as shown in FIGS. 4B and 4C respectively become shadows depending on the thickness of each layer in the patterning processes-exposure and development-using a pattern for subsequent electrodeposition. Here arises a possibility that these shadow regions remain unexposed. Complete removal of these parts can be achieved by extending the exposure time and developing time. However, since these methods are basically beyond the scope of suitable exposure and development conditions, unfavorable effects such as an extension of the pattern width occur. This shortcoming can be solved by the above-mentioned modification, where only exposure is done by using photo-masks corresponding to magnetic films 18 and 17 before the magnetic films 19 and 18 are electrodeposited and thereafter the development is carried out. Positions 28 and 30 do not become shadows and hence to not remain unexposed. This ensures good patterning. Here, we note the following points for reference. The accumulation layer of magnetic core 16 according to the constitution of this invention can be discriminated from the lower and upper magnetic cores 2 and 6 in a prior art as shown in FIG. 1 as follows: after the cross-sections are exposed by cutting and polishing as shown in FIG. 1 and FIG. 3B, minute differences of compositions of the magnetic films are detected by using various analyzing methods such as observation by an electron microscope or by an X-ray microanalyzer.

Figure 5:
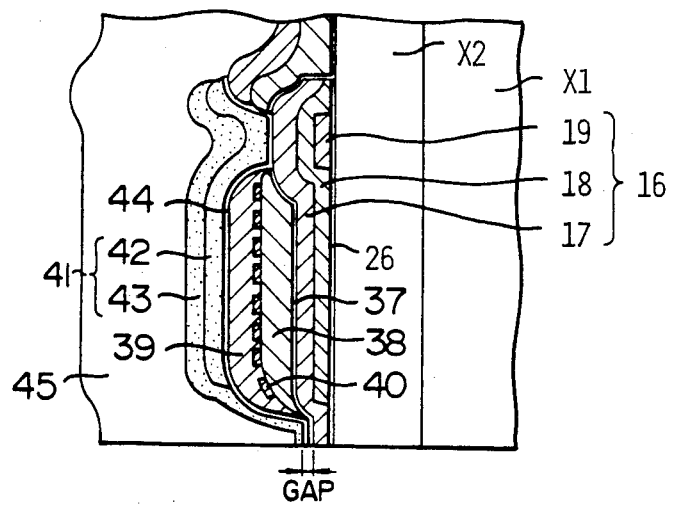
FIG. 5 is a cross-section view showing a concrete embodiment of this invention.

FIG. 5 shows a concrete embodiment of a thin film head for an electronic computer, wherein a part of the magnetic circuit is composed of an accumulation layer of magnetic cores. Detailed explanation will be made next with reference to FIG. 5. A non-magnetic insulation layer $X_2$ of $SiO_2$ or $Al_2O_3$, etc. is formed by the sputtering method on a non-magnetic substrate $X_1$ of $Al_2O_3$-TiC, etc. Next, an electrode layer 26 for electrodeposition of Ni-Fe alloy with a thickness of from 500 Å to a few thousands Å is formed by sputtering. Magnetic films 19, 18 and 17 wich comprise the lower magnetic core 16 are successively formed by the electrodeposition method. The manufacturing procedures are as described before. The bath for electrodeposition to obtain an electrodeposition film of Ni-Fe alloy contains the followings.

$NiSO_4.6H_2O$: 300 (g/l)
$NiCl_2.6H_2O$: 30 (g/l)
$FeSO_4.7H_2O$: 14.6 (g/l)
$H_3BO_4$: 40 (g/l)

Sodium saccharin: 1.5 (g/l)
Sodium Laurylsulfate: 0.25 (g/l)

The bath temperature is 40±1° C., pH is 2.2, and the current density is adjusted between 8 and 15 mA/cm² in order to obtain a desired composition. Thereafter, a non-magnetic insulation layer 37 of SiO₂ or Al₂O₃ which becomes a magnetic gap layer is formed by sputtering. An interface insulation layer is formed by photoresist layers 38 and 39. Within this insulation layer, a coil part 40 is formed by electrodeposition of Cu. Magnetic films 42 and 43 are formed on an electrode 44 for electrodeposition to constitute an upper magnetic core 41, in accordance with the method as shown above. Finally, a protecting layer 45 of a non-magnetic insulator such as SiO₂ or Al₂O₃ is formed by the sputtering method. The thin film head is finished by cutting and polishing up to a prescribed position of the gap depth. Wiring is installed to connect the terminal of the coil part 40 with an external circuit. In the case of a floating type head, the film is fixed on a flexure.

The following results are obtained from the above-mentioned constitution.

(1) Since the coating of a photoresist has to be done only once, labors such as removal and re-coating of the photoresist are not necessary. Operation time is thereby shortened. Since baking for avoiding the mutual interferences between photoresists is not required, degeneration of a surface for electrodeposition is reduced and stable electrodeposition is ensured.

(2) Since a larger pattern is electrodeposited on a smaller pattern, a levelling effect wherein a sharp portion is rounded appears, which is inherent to the electrodeposition. Thus, the spacing between the upper and lower magnetic cores is maintained. This improves the magnetic efficiency. Furthermore, when a protecting layer is formed, defects such as micro-cracks which are easily grown or generated on sharp positions can be remarkably supressed. Thus, the yield of magnetic heads can be promoted.

According to this invention, the magnetic property of a thin film magnetic head cna be improved and the magnetic efficiency enhanced. Since the number of manufacturing steps is decreased, the operation time can be reduced. Moreover, defects such as microcracks can be suppressed and the product yield increased.

We claim:

1. A thin film magnetic head comprising
   a substrate;
   a first magnetic core including
   a first magnetic film deposited on said substrate;
   a second magnetic film deposited over said first magnetic film and said substrate, said second magnetic film having a larger surface area than said first magnetic film; and
   a third magnetic film deposited over and completely covering said second magnetic film, said third magnetic film having a larger surface area than said second magnetic film;
   a second magnetic core comprising at least two magnetic films deposited on said first magnetic core; and
   a coil interposed between said first and second magnetic cores, said first and second magnetic cores being separated by a magnetic gap layer thereby defining a magnetic transducer gap.

* * * * *